March 26, 1940.    R. C. HOYT    2,195,130
FLUID COOLING SYSTEM FOR BRAKES
Filed May 11, 1938    5 Sheets-Sheet 1

Inventor
Roy C. Hoyt
By Chas. C. Reif
Attorney

March 26, 1940. R. C. HOYT 2,195,130
FLUID COOLING SYSTEM FOR BRAKES
Filed May 11, 1938 5 Sheets-Sheet 2

Inventor
Roy C. Hoyt
By Chas. C. Reyf
Attorney

March 26, 1940.    R. C. HOYT    2,195,130
FLUID COOLING SYSTEM FOR BRAKES
Filed May 11, 1938        5 Sheets-Sheet 3

Inventor
Roy C. Hoyt
By Chas. C. Reyf.
Attorney

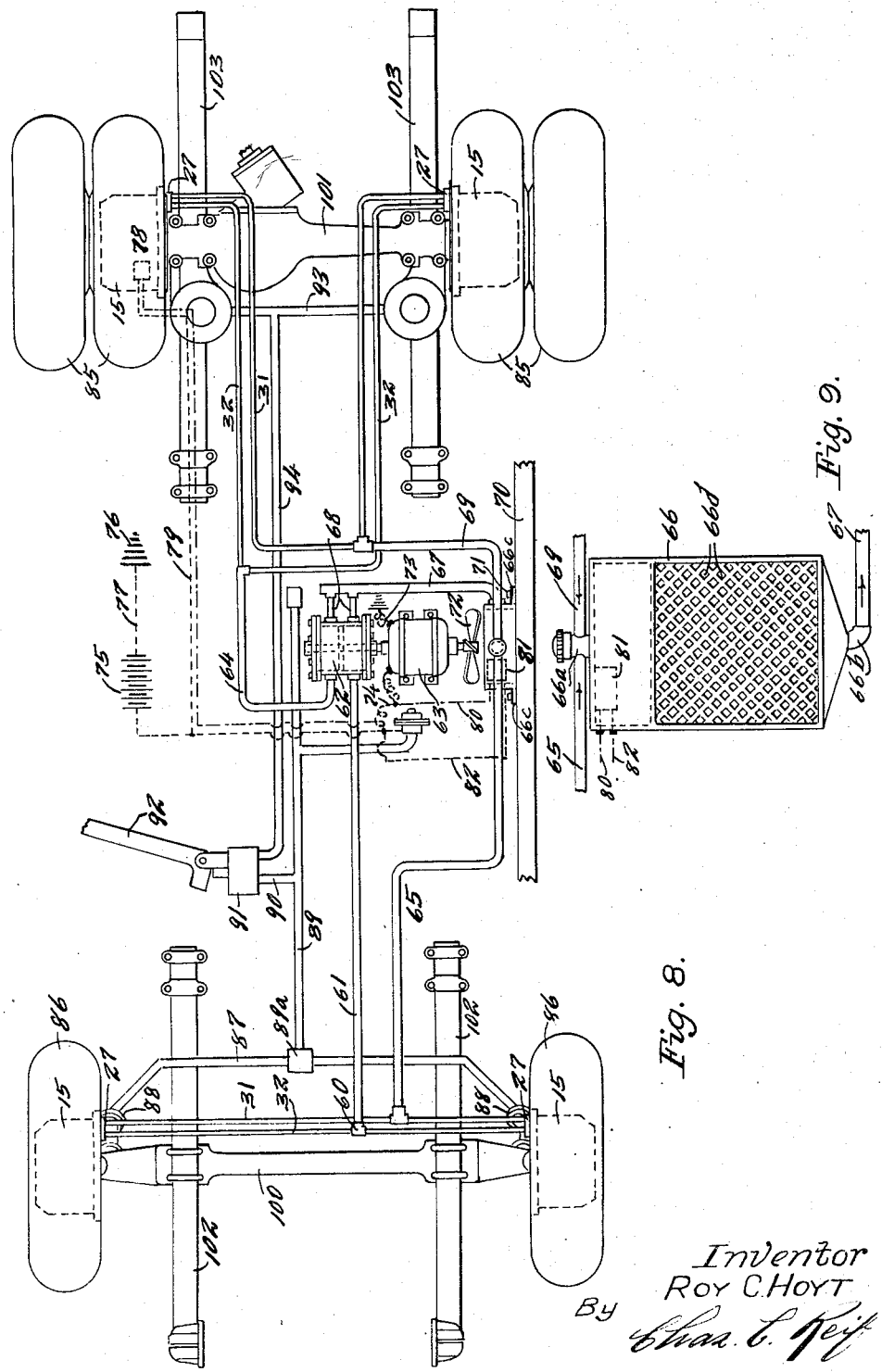

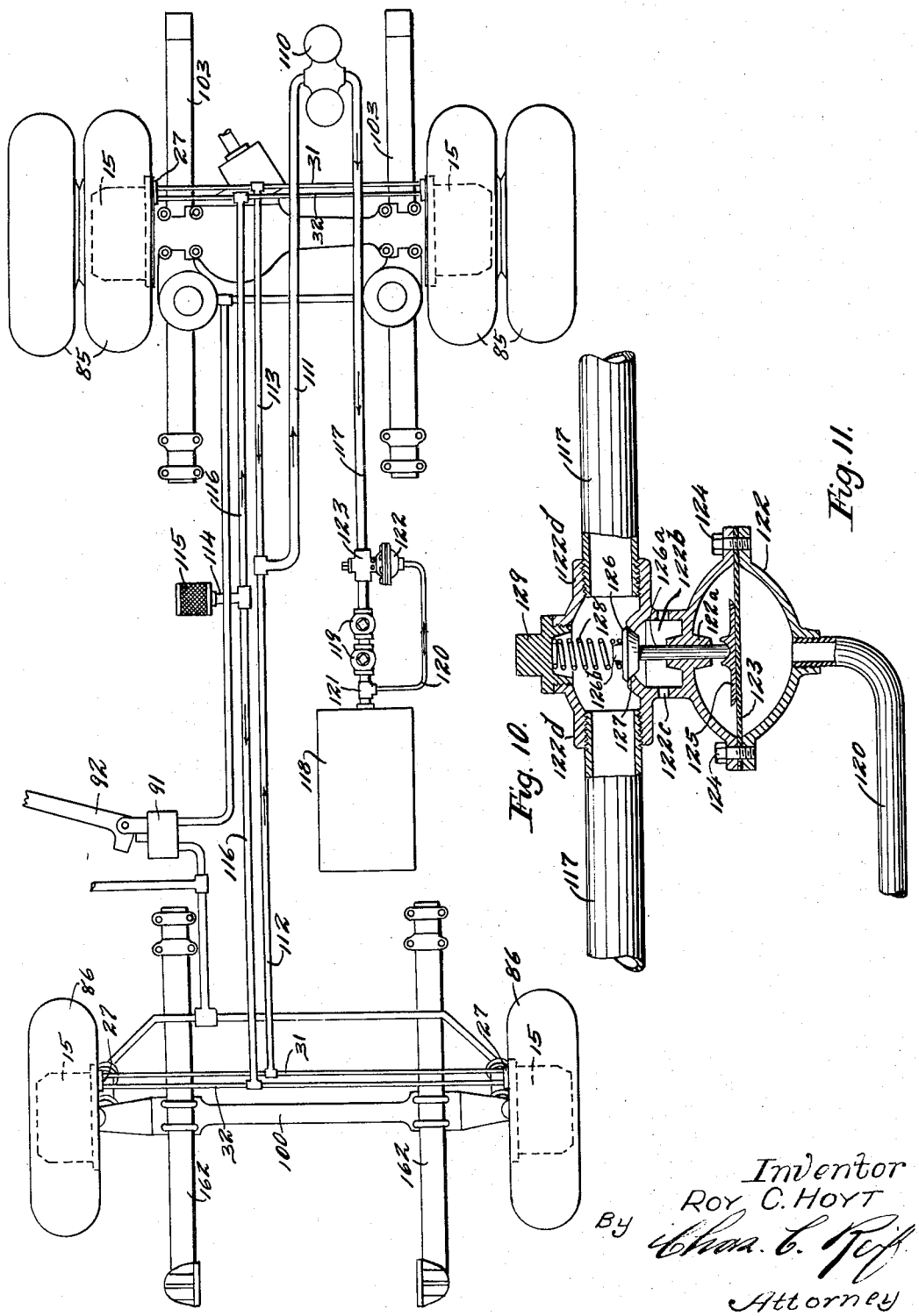

Patented Mar. 26, 1940

2,195,130

UNITED STATES PATENT OFFICE 2,195,130

FLUID COOLING SYSTEM FOR BRAKES

Roy C. Hoyt, Chicago, Ill.

Application May 11, 1938, Serial No. 207,208

18 Claims. (Cl. 188—264)

This invention relates to a braking mechanism for vehicles and particularly to a mechanism for cooling such brakes.

It has been found that with heavy vehicles such as the modern busses and trucks that the brake shoes and drums become highly heated. This is particularly true when the vehicle is traversing a hilly or mountainous country and it is necessary to apply the brakes frequently and for considerable periods. The brakes become so highly heated as to carbonize the oil and other lubricant used and to seriously damage the frictional material of the brake shoes.

It is an object of this invention to provide a comparatively simple and effective means for cooling the brake shoes and adjacent parts to prevent damage to the braking mechanism.

It is a further object of the invention to provide a brake mechanism including a brake shoe, said shoe having a passage or chamber therein together with means for circulating a cooling fluid through said passage or chamber.

It is another object of the invention to provide a braking mechanism having movable shoes together with means for cooling said shoes constructed and arranged to circulate a fluid through said shoes without interfering with the movements of said shoes in the braking operation.

It is still further an object of the invention to provide a cooling mechanism for vehicle brakes including braking shoes comprising means for positively circulating a fluid through said shoes together with means for cooling said fluid.

These and other objects and advantages of the invention will be fully set forth in the following description made in connection with the accompanying drawings in which like reference characters refer to similar parts throughout the several views and in which:

Fig. 8 is a plan view showing parts of the vehicle and other parts used with the present invention;

Fig. 9 is a partial view in side elevation as seen from the lower or bottom side of Fig. 8;

Fig. 10 is a plan view similar to Fig. 8 showing a modified construction; and

Fig. 11 is a partial view similar to Fig. 10 on an enlarged scale, some parts being broken away and others shown in vertical section.

Figure 1:
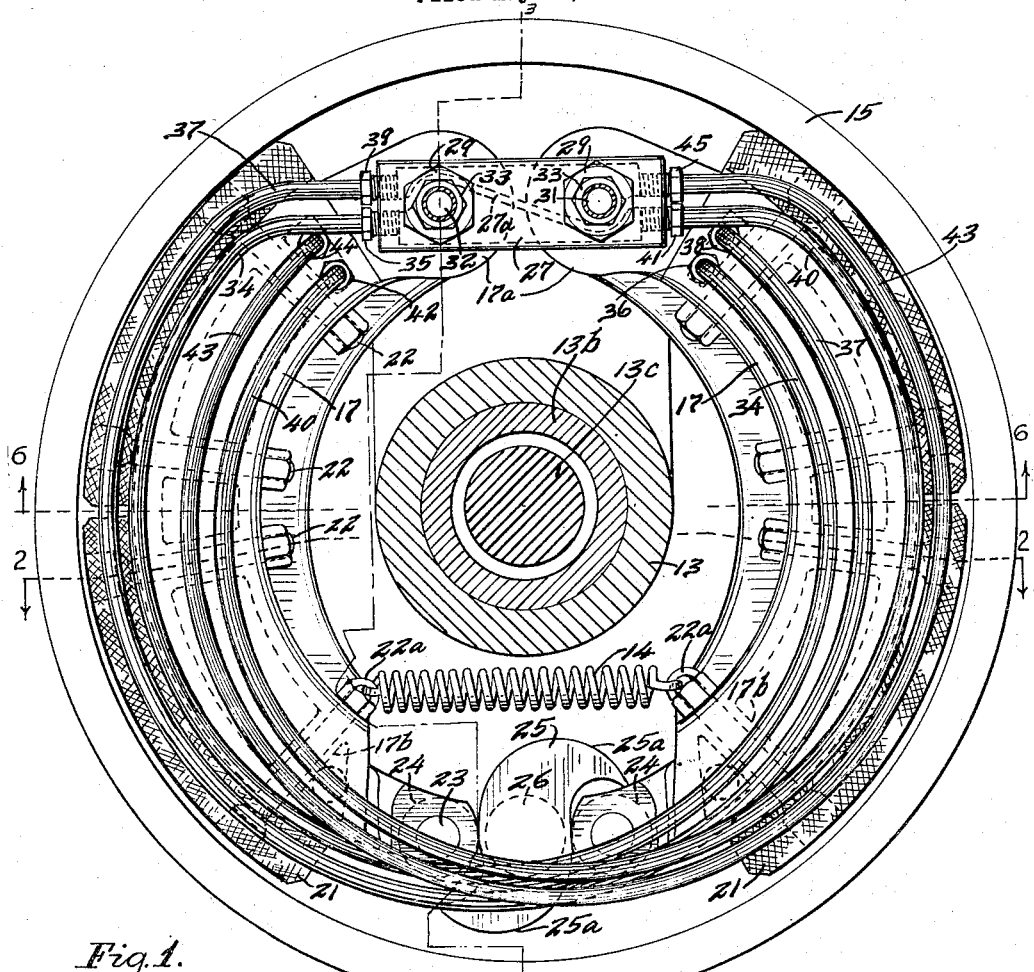
Fig. 1 is a view in side elevation of the brake mechanism, the supporting parts being shown in vertical section.
Figure 2:
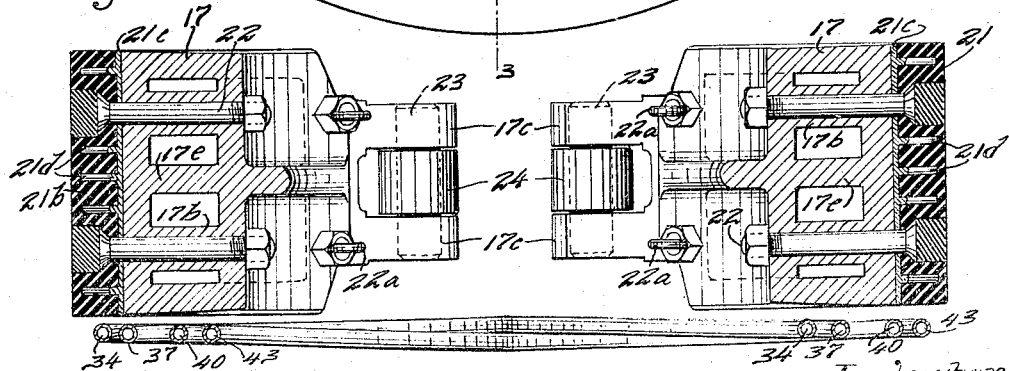
Fig. 2 is a horizontal section taken on line 2—2 of Fig. 1 as indicated by the arrows.

Referring to the drawings a brake drum 15 is shown of the usual cylindrical form, which drum will be secured to the wheel of the vehicle by a number of circumferentially spaced bolts 16. Brake shoes 17 are provided and while the number of such shoes may vary, in the embodiment of the invention illustrated four shoes are shown, these being arranged in two oppositely disposed pairs. Pintle members 18 and 19 extend into the drum 15 and the shoes 17 have bosses or hubs 17a at one end disposed centrally of said shoes which are journalled on the pintles, a bushing 20 being disposed in said bosses and engaging said pintles. The shoes 17 are shown of the usual crescent-like or curved form and have outer concave surfaces to which the bearings members or linings 21 are secured. Members 21 are secured to said shoes by a plurality of nutted bolts 22 shown as having hubs countersunk in holes 21a in members 21. Bolts 22 pass through the cast hubs or sleeves 17b extending through the shoes 17 from the outer sides to the inner side thereof. Each member 21 is made of suitable friction material 21b and this engages with a metallic backing plate 21c at the concave side of said member. Plate 21c has projecting therefrom a multiplicity of pins 21d embedded in the material 21b. Plates 21c and pins 21d will be made of a metal having high conductivity such as copper. The shoes 17 at the ends opposite their pintles have spaced bosses 17c in which are secured the pins 23 extending between said bosses and carrying rollers 24. A cam member 25 is disposed at the free ends of shoes 17 and between rollers 24, the same having cam surfaces 25a adapted to engage rollers 24. Cam 25 is carried on the usual operating shaft 26. In accordance with the present invention each shoe 17 is provided with a chamber 17d therein and a partition 17e extends longitudinally of the shoe substantially midway thereof, said partition having an opening 17f therethrough adjacent the free end of said shoe but at other points dividing chamber 17d into two parts for passages at either side of said shoe. The pintles 18 and 19 are provided with bores or passages 18a and 19a extending axially therethrough and said pintles have reduced portions 18b and 19b at one end which extend into and fit into openings extending through a casing 27 disposed adjacent and alongside a pair of oppositely extending shoes 17. Washers 28 are disposed between one side of casing 27 and the end surfaces of pintles 18 and 19. The portions 19b and 18b are threaded at their ends and nuts 29 are threaded on said portions and engage a packing plate or gasket 30 disposed between the same and the outer side of casing 27. Pipes or conduits 31 and 32 are connected to the nuts 29 by the coupling members 33, said pipes having their ends engaging the outer ends of portions 18b and 19b respectively. Casing 27 is shown as of substantially rectangular form in vertical and horizontal cross section and as having a chamber therein, the same having a partition 27a extending longitudinally thereacross dividing the chamber into compartments 27b and 27c. Portion 18b of pintle member 18 has a plurality of holes 18c extending therethrough and affording communication between passage 18a and chamber 27c and portion 19b of pintle member 19 has a plurality of holes 19c extending therethrough and affording communication between passage 19a and chamber 27b. A conduit 34 is connected to one end of casing 27 by a suitable coupling 35 and communicates with chamber 27b, said conduit extending along one side of oppositely extending shoes 17 in substantially circular form and the same is connected to one side of the opposite shoe mounted on pintle 18 by a suitable coupling 36, said conduit communicating with the chamber 17d of said shoe 17. Another conduit 37 is connected by a suitable coupling 38 to the same side of the shoe to which conduit 34 is connected and extends along the sides of the adjacent shoes 17 substantially parallel to conduit 34, the same being connected by a suitable coupling 39 to the end of casing 27 and communicating with chamber 27c therein. The end of conduit 37 connected to the shoe communicates with a passage or bore 17g extending from the outer side of said shoe to and through partition 17e so as to communicate with the compartment at the side of partition 17e opposite to that with which tube 34 communicates. A conduit 40 is connected to the other end of casing 27 by a suitable coupling 41, the same communicating with chamber 27b and conduit 40 extends in substantially circular form about drum 15, the other end thereof being connected to the shoe 17 opposite that to which conduit 34 is connected by a suitable coupling 42. Conduit 40 communicates with the chamber 17d in said shoe 17. Another conduit 43 is connected by a suitable coupling 44 to the shoe 17 to which conduit 40 is connected and at a point adjacent said conduit. Conduit 43 extends alongside the adjacent shoes and about drum 15 in substantially circular form and is connected at its other end by a suitable coupling 45 to casing 27 at the same end with which conduit 40 connects but communicating with chamber 27c.

The pintles 18 and 19 also have reduced portions 18d and 19d at their other ends which extend through openings in a casing 46, washers 47 being disposed between said casing and the end surfaces of said pintles. Said reduced portions 18d and 19d are threaded at their ends to receive closing caps 48 which engage with a gasket or packing plate 49 which engages the outer side of casing 46. Casing 46 is similar in all respects to casing 27 and is traversed by a longitudinally extending partition 46a dividing the same into compartments 46b and 46c. Reduced portion 19d has a plurality of holes 19e extending therethrough connecting passage 19a with chamber 46b. Reduced portion 18d has a plurality of holes 18e extending therethrough connecting passage 18a with compartment 46c. A conduit 50 extends from compartment 46b being connected to casing 46 by a suitable coupling 51, said conduit 50 extending in circular form alongside the adjacent shoes 17, the same being connected to the outer side of one of said shoes adjacent its pintle by a suitable coupling 52. Another conduit 53 is connected to the same shoes 17 adjacent coupling 52 by another coupling 54, said conduit extending in substantially circular form adjacent conduit 50 and being connected to the same end of casing 46 as is conduit 50 but communicating with chamber 46c therein. Another conduit 55 is connected to the opposite end of casing 46 by a suitable coupling 55a, the same communicating with compartment 46b and said conduit also extends in substantially circular form about the drum 15, the same being connected at its other end to the shoe opposite the shoe to which conduit 50 is connected and adjacent the pintle thereof so as to communicate with the compartment 17d therein. Another conduit 56 extends from the same shoe to which conduit 55 is connected in substantially circular form and is connected to casing 46 at the same end to which conduit 55 is connected but communicates with chamber 46c. Conduit 53 communicates with a bore or passage 17h which extends from the side of its shoe 17 to a point beyond the partition 17e therein, said passage corresponding to passage 17g already described. From the structure described it will be seen that there is a set of conduits at each side of the shoe, the same as shown in Fig. 1. The four conduits at each side of the shoes are connected as described to the casings 27 and 46 respectively and have the same relation to said casings and shoes at each side of the shoes. In other words, the structure shown at the side of the shoes in Fig. 1 is duplicated at the opposite side of the shoes. The shoes 17 at opposite sides of the drum are connected by the usual spring 14, the ends of the spring being secured in loops 22a formed on some of the bolts or nuts 22. The brackets 13a or portions extending from the wheel hubs 13 for supporting the pintles are shown in Fig. 1. Hub 13 surrounds the axle sleeve 13b through which extends the axle 13c. These parts are of the usual and well known construction and form no part of the present invention.

The conduit 32 which communicates with pintle 18 is connected by a T 60 to a conduit 61 which extends to the delivery port of a rotary pump 62 driven by a suitable motor 63 shown as of the electrical type. Another conduit 64 is connected to a delivery or discharge port of pump 62, which pump is illustrated as of the duplex type or having two delivery outlets and conduit 64 is connected to conduits 32 which extend to casings 27 at the wheels of the vehicle. Conduit 31 extending from the casings 27 at the front wheels as seen in Fig. 8, is connected to a conduit 65 which extends to the top inlet portion 66a of a cooling radiator 66. The outlet portion 66b of said radiator shown at the bottom thereof is connected to a conduit 67 which is in turn connected by the branch conduits 68 to the inlet ports of pump 62. The conduits 31 from the rear wheels are connected to a conduit 69 which also connects to the inlet member 66a of the radiator 66. Radiator 66 is shown as having flanges 66c connected to the frame 70 of the vehicle by bolts 71. Radiator 66 will be of the type commonly used in automobiles having small passages extending from the top to the bottom thereof, air passages 66d being arranged between the said small passages for the fluid to be cooled. A fan 72 is provided connected to motor 63 and disposed adjacent the openwork portion of radiator 66. Motor 63 is shown as having conductors 73 and 74 connected respectively to the ground and to a battery 75. Battery 75 is indicated as being connected to the ground 76 by conductor 77. Conductor 74 before passing to the motor extends to and is connected to a thermostatic control member 78 disposed adjacent one of the control shoes 17. A conductor 79 extends from control member 78 to battery 75. Another conductor 80 extends from conductor 74 to a thermostatic control member 81 disposed in the header chamber of radiator 66 and a conductor 82 extends from control member 81 to battery 75, the same connecting with conductor 79.

In Fig. 8 the rear double wheels 85 of the vehicle are shown in the inner of which is disposed the brake drum 15 and the front wheels 86 of the vehicle are shown in which are disposed the brake drums 15. Conduits 87 are shown extending to air operating cylinders 88 for the brakes of the front wheels, the same being connected through member 89a to a conduit which is connected by conduit 90 to a control member 91 shown as having connected thereto an operating lever 92 for manipulation by the operator. A conduit 93 is shown for supplying air to the operating cylinders for the rear brakes which is connected to another conduit 94 also connected to the control member 91.

The front and rear axle-supporting members 100 and 101 are illustrated, the former being shown as connected to the front supporting springs 102 and the latter as connected to the rear supporting means 103. No further parts of the vehicle need be illustrated.

In operation, the brake shoes 17 will be operated in the usual manner from the control lever 92 and control member 91 by air passing through conduits 89 and 94 to the brake operating cylinders at the wheels. While any usual and well known operating mechanism for the brakes might be used, the air operating system now commonly used on busses is illustrated. A cooling fluid will be provided and will be circulated by pump 62. Such cooling fluid will have a low freezing point and while a somewhat thick cooling fluid may be preferred, any of the well known cooling fluids now used for cooling internal combustion engines might be used. This fluid will be taken from the lower end of radiator 66 and the fluid as it passes through said radiator, will be cooled by air caused to pass through said radiator by fan 72. The fluid after thus being cooled passes through the pump and will be delivered to conduits 61 and 64 and will be delivered by said conduits to the conduits 32 at the different wheels. The fluid will pass from conduit 32 into compartment 27b of casing 27 and will also pass through passage 19a of pintle 19 to compartment 46b of casing 46.

Figure 3:
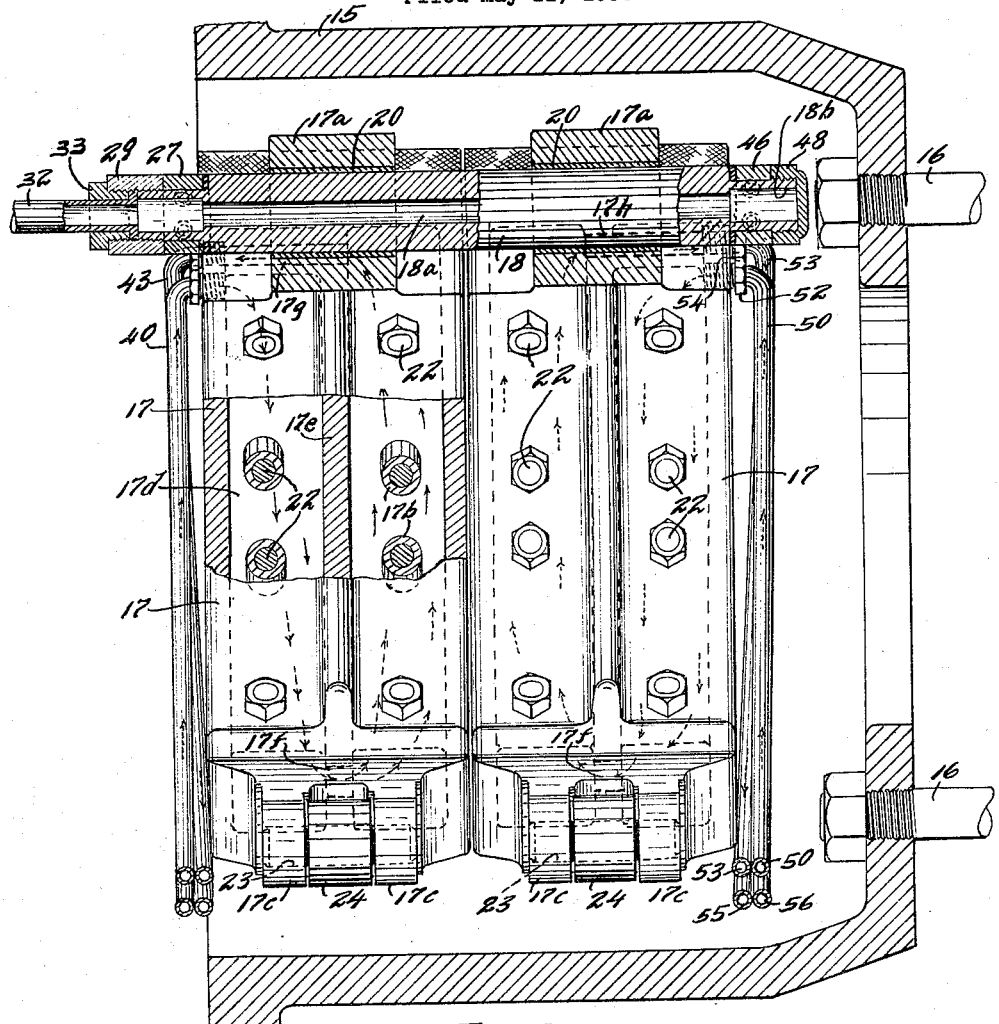
Fig. 3 is a vertical section taken partially on line 3—3 of Fig. 1, some parts being further broken away and others shown in vertical section.
Figure 4:
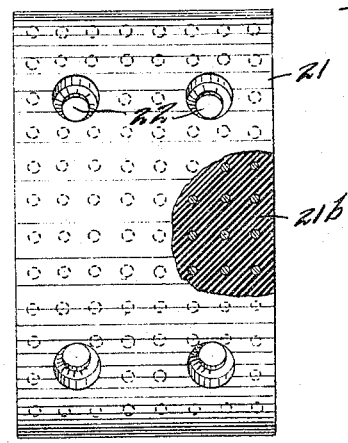
Fig. 4 is a view in elevation showing the convex side of a brake shoe plate, a portion being shown in vertical section.
Figure 5:
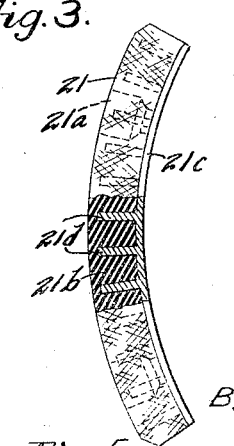
Fig. 5 is a view in side elevation as seen from the right of Fig. 4, a portion being shown in vertical section.
Figure 7:
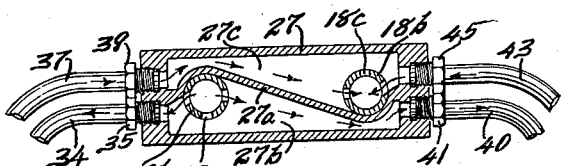
Fig. 7 is a vertical section taken on line 7—7 of Fig. 6 as indicated by the arrows.
Figure 6:
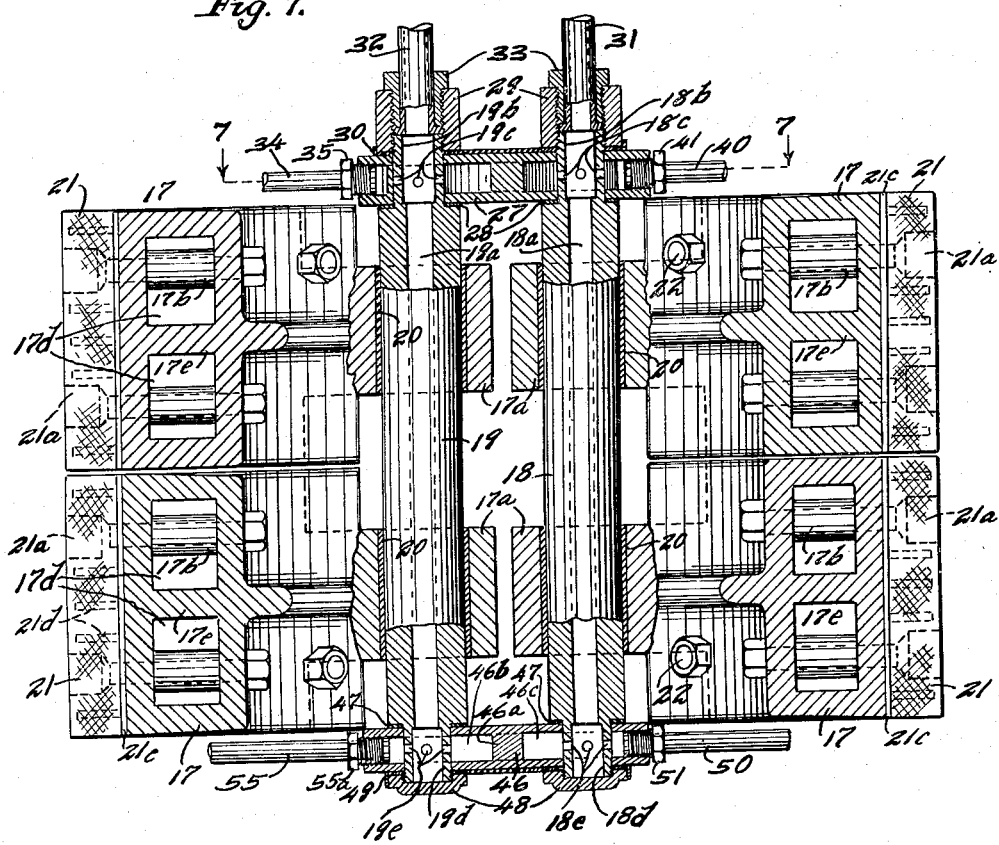
Fig. 6 is a horizontal section taken substantially on line 6—6 of Fig. 1 as indicated by the arrows, some parts being further broken away and others shown in horizontal section.

From compartment 27b the fluid will pass through conduit 34 to one of the shoes 17 as shown in Fig. 3 and as indicated by the arrows, the fluid will pass through the compartment at one side of partition 17e in said shoe to the other or free end of the shoe then through opening 17f to the compartment at the other side of partition 17e as indicated by the arrows and through passage 17g to conduit 37 and through conduits 37, back to casing 27 and to compartment 27c thereof. From compartment 27c the fluid will pass through holes 18c into passage 18a of pintle 18 and thence into conduit 31. The fluid will pass from conduits 31 through conduits 65 and 69 to radiator 66. Fluid will also pass from compartment 27b of casing 27 through conduit 40 to the other shoe 17 adjacent the pintle thereof and after passing lengthwise of said shoe and through opening 17f thereof will pass through passage 17h to conduit 43, back to casing 27 and compartment 27c thereof whence it will pass through passage 18a back to conduit 31 and back to the radiator as above described. Likewise the fluid will pass through passage 19a of pintle 19 through holes 19e to compartment 46b of casing 47 and through conduits 50 and 53 to the pintle ends of the other shoes 17. The liquid will traverse these shoes lengthwise thereof in the circuitous path provided by partition 17e and will return to compartment 46c through conduits 55 and 56 back to compartment 46c of casing 46 then through holes 18d into passage 18a of pintle 18 and to conduit 31. The fluid from conduits 31 will pass to the radiator as already described. It will thus be seen that when motor 63 and pump 62 are operating that the cooling fluid is positively circulated through the shoes 17 and through the pintles 18 and 19 and that the fluid flows in a circuitous path through the shoes. The heat generated by the friction of the brakes will therefore be quickly carried away by the cooling fluid. The cooling fluid will be cooled as it passes through the radiator 66. As stated, air will be forced through the radiator by the fan 72 which operates whenever the motor 63 is operating. When the cooling fluid is below a certain temperature there is no reason for further cooling it and at such times the circulation of the fluid is unnecessary. The motor therefore, is under the control of the thermostatic control member 81 in radiator 66. If the cooling fluid increases above a desired and determined point in temperature member 81 will act to start motor 63 so that the circulation of the cooling fluid will be commenced and the fluid will be brought to a lower temperature. It is also desired that the temperature in the brake drums be kept below a certain point and motor 63 is thus under a control of the thermostatic control members 78 which will be disposed in contact with one or more of the shoes 17. When the temperature of the shoes increases beyond a desired and determined point member 78 will act to start motor 63 so that the cooling fluid will be circulated and will absorb and carry away the heat from the brake shoes.

In Figs. 10 and 11 a modification of the invention is shown. It is the common practice to have compressed air on the modern busses, which compressed air is used among other things for operating the brakes. For this purpose a compressor indicated 110 is provided which is suitably driven preferably by an electric motor (not shown). An intake pipe 111 is connected to the intake side of the compressor and in the embodiment of the invention illustrated in Figs. 10 and 11 this pipe will be connected to the conduits 112 and 113 in turn connected to the conduits 31 described in connection with Figs. 1 to 9. The structure at the wheels will be, as described in connection with Figs. 1 to 9, and will include the casings 27 and 46 and the means for circulating the fluid in the shoes. The air intake conduit is shown as 114 connected to a filter 115. The air to be compressed is drawn through filter 115 into pipe 114 and then through pipes or conduits 116 which are connected to the conduits 32 already described. The discharge pipe for the compressed air in the conveyor is shown as 117 which is connected to the usual reservoir 118 in which the compressed air is stored. Check valves 119 are disposed in the conduit 117 and prevent the passage of air outwardly from the reservoir 118 into conduit 117. The compressed air will be conducted from reservoir 118 to the desired places by the usual conduits (not shown). A smaller conduit 120 is connected to conduit 117 adjacent reservoir 118 by the T member 121. Conduit 120 as shown in Fig. 11 is connected to the lower side of the diaphragm casing 122 having upper and lower portions with mating circular flanges between which is clamped and secured a diaphragm 123, said flanges being connected by a plurality of circumferentially spaced bolts 124. Diaphragm 123 will be made of any suitable material having flexibility. Casing 122 has a chamber therein above and below diaphragm 123 and a shoe 125 having a lower surface of considerable area engaging diaphragm 123 rests on the top of said diaphragm and is engaged by the stem 126a of a valve member 126. Stem 126a extends through a guiding hub 122a at the upper part of casing 122 and carries the valve 126 which seats downwardly upon the valve seat 127 surrounding an opening connecting conduit 117 to a chamber 122b formed in casing 122 above the hub 122a. Chamber 122b has a plurality of holes 122c communicating with the atmosphere. Valve 126 is resiliently urged downwardly to its seat by a compression coiled spring 128 surrounding a projection 126b on valve 126 at its lower end and engaging in a recess of a plug 129 at its upper end, which plug is threaded into the top of T member 122d forming part of the casting of casing 122. As shown in Figs. 10 and 11 portion 122d is inserted in the conduit 117 the latter being threaded into the opposite ends thereof.

The compressor 110 on the vehicle is driven for a considerable portion of the time and is sometimes continuously driven. With the present invention it preferably will be continuously driven. Air drawn through filter 115 and the intake conduit 114 will pass through the shoes, the casings 27 and 46 and the conduits connecting said casings and shoes. Air will also pass through the pintles 18 and 19 of the shoes and will be drawn from conduits 31 into the conduits 112 and 113 then through conduit 111 to the compressor 110. The air will be discharged through conduit 117 into the reservoir 118. When the pressure in reservoir 118 exceeds the desired amount the pressure will be transmitted from said reservoir through conduit 120 and the lower side of diaphragm 123. Diaphragm 123 and thus shoe 125 will be raised and this will lift stem 126a and valve 126. Any further air delivered through conduit 117 by the compressor will then pass through the opening in seat 127 into chamber 122b and to the atmosphere through holes 122c. The check valve 119 will prevent the air from passing back in conduit 117 toward member 123. The desired air pressure will thus be maintained in rservoir 118 and at the same time air will be continuously drawn through the brake shoes and these shoes will thus be cooled. With the structure shown in Figs. 10 and 11 it will not be necessary to use an additional cooling fluid for the shoes but the air used for the compressed air will constitute the cooling fluid.

From the above description it will be seen that I have provided quite a simple and yet highly efficient structure for maintaining the brake shoes of the vehicle at a low temperature. It is not necessary, of course, that these brake shoes be kept at a very low temperature. It is sufficient if the temperature is kept below points which will adversely affect the frictional material used and the necessary lubricants adjacent the brake mechanism. The mechanism described in no way interferes with the operation of the brakes. The curved conduits 34, 37, 40 and 43 and the similar conduits for the other shoes are easily flexed to permit the usual operation of the brakes. The brake shoes, of course are operated by rotation of shaft 26 which causes cam 25 to separate rollers 24 and thus move the shoes outwardly against the brake drum. The metal plates 21c and projections 21d made of a metal having high heat conductivity assist in carrying off the heat generated by the shoes. The mechanism can readily be applied to vehicles now in use and can be installed at comparatively small expense. It is apparent that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A brake mechanism for a vehicle having in combination, a brake drum, a brake shoe adapted to engage said drum to produce the braking effect, said shoe having a chamber therein, a pintle about which said shoe oscillates having a passage therethrough, a casing carried on said pintle, means for supplying a cooling fluid to said casing and means for circulating fluid from said casing through said chamber and said passage in said pintle.

2. A brake mechanism for a vehicle having in combination, a brake drum, a brake shoe adapted to engage said drum to produce the braking effect, a pintle upon which said shoe is oscillatably mounted, said shoe having a chamber therein, a member carried by said pintle at one side of said shoe and having a pair of chambers therein, means for supplying a cooling fluid to one of said chambers, a conduit connected to said one chamber for conducting said fluid to said chamber in said shoe, a second conduit for conducting said fluid from said shoe to the other chamber in said member and a conduit for carrying said fluid away from said last mentioned chamber.

3. A brake mechanism for a vehicle having in combintion, a brake drum, a plurality of pairs of oppositely disposed brake shoes arranged to engage said drum to produce the braking effect, said brake shoes having chambers therein, a pintle on which said shoes are mounted for oscillation, a casing adjacent each pair of shoes having a pair of chambers therein, means for supplying cooling fluid through said pintle to one of said chambers in each casing, means conducting said fluid from said one chamber through said pairs of shoes respectively and returning it to the other chamber of each casing and means for exhausting said fluid from the other chamber of each casing.

4. A brake mechanism for a vehicle having in combination, a brake drum, two pairs of shoes adapted to engage said drum to produce the braking effect, each of said shoes having a chamber therein, a pair of pintle members, two shoes being mounted upon each pintle for oscillating movement thereon, a casing at either side of said shoes, each casing having a supply and an exhaust chamber therein, means for supplying cooling fluid to said supply chamber of each casing through one of said pintles, means for circulating fluid from said supply chamber of each casing through a pair of said shoes and back to the other chamber of each casing respectively and means for exhausting fluid from the exhaust chamber of each casing through said other pintle.

5. A brake mechanism for a vehicle having in combination, a brake drum, a shoe adapted to engage said drum to produce the braking effect and having a passage therein, a pintle member on which said shoe is mounted for oscillating movement, a casing adjacent said pintle having a pair of chambers, means for supplying cooling fluid to one of said chambers in said casing, a conduit connected to said one chamber and extending in substantially circular form to and communicating with said shoe adjacent said pintle and extending in circular form and connected to said casing and communicating with the other chamber in said casing and means for exhausting said fluid from said other chamber in said casing.

6. A brake mechanism for a vehicle having in combination, a brake drum, a pair of pintle members, a pair of shoes oscillatably mounted respectively on said pintle members and oppositely disposed to move away from each other to engage said drum, each shoe having a passage therethrough, a casing adjacent said pintles having a pair of chambers therein, means for supplying cooling fluid to one of said chambers in said casing, a conduit connected to said casing and communicating with said one chamber, said conduit extending in substantially circular form about said drum and connected at its other end to one of said shoes adjacent the pintle thereof and a second conduit connected to said shoe adjacent the pintle thereof and communicating with the passage therein, said second conduit extending in circular form about said drum and connected to said casing and communicating with the other chamber therein, a third conduit connected to said one chamber of said casing and extending about said drum in substantially circular form and connected to said other shoe adjacent the pintle thereof and communicating with the chamber therein, a fourth conduit connected to said second shoe adjacent the pintle thereof and communicating with the chamber therein and extending in circular form about said drum and connected to said second chamber in said casing and means for exhausting said cooling fluid from said second chamber in said casing.

7. The structure set forth in claim 6, said first and second conduit being connected to one end of said casing and said third and fourth conduits being connected to the other end of said casing.

8. The structure set forth in claim 6, said casing being mounted on said pintles and said pintles having passages therethrough and said chambers in said casing communicating respectively with said passages in said pintles.

9. A brake mechanism for a vehicle having in combination, a brake drum, oppositely disposed curved brake shoes in said drum adapted to engage said drum, said shoes having passages therethrough extending substantially from end to end therein, means for circulating a cooling medium through said passages including a pair of conduits connected to each of said shoes and extending in substantially circular form in said drum adjacent said shoes.

10. A brake mechanism for a vehicle having in combination, a brake drum, a brake shoe adapted to engage said drum to produce the braking effect, said shoe having a passage therethrough, means for circulating a cooling fluid through said passage and means controlled by the temperature of said fluid for controlling said last mentioned means.

11. A brake mechanism for a vehicle having in combination, a brake drum, oppositely disposed shoes in said drum having surfaces engaging said drum to produce the braking effect, said shoes having passages therethrough, a supply conduit for each shoe for delivering cooling fluid thereto and connected to said passage, said conduit extending in substantially circular form in said drum adjacent said shoe and means for exhausting said fluid from said passage in said shoe.

12. A brake mechanism for a vehicle having in combination, a brake drum, oppositely disposed shoes in said drum having surfaces engaging said drum to produce the braking effect, said shoes having passages therethrough, a supply conduit for each shoe for delivering cooling fluid thereto and connected to said passage, said conduit extending in substantially circular form in said drum adjacent said shoe, an exhaust conduit for each shoe connected to said passage and extending in substantially circular form in said drum adjacent said shoe and means for circulating said fluid through said conduits.

13. The structure set forth in claim 12, pintles on which said pairs of shoes are oscillatably mounted and means for passing said fluid through said pintles to supply fluid to and to exhaust the same from said conduits.

14. A brake mechanism for a vehicle having in combination, a brake drum, a pair of brake shoes in said drum adapted to be moved to engage said drum to produce the braking effect, said shoes each having a chamber therein, a casing disposed at one side of said shoes, means for supplying a cooling fluid to said casing, means for conducting said fluid from said casing to said chambers and said shoes and back to said casing and means for carrying said fluid from said casing.

15. A brake mechanism for a vehicle having in combination, a brake drum, a pair of brake shoes adapted to engage said drum to produce the braking effect, said shoes each having a chamber therein, pintles about which said shoes respectively oscillate, a casing carried upon said pintles at one side of said shoes, means for supplying cooling fluid to said casing, means for conducting said cooling fluid from said casing to and through said chamber in said shoes and back to said casing and means for carrying said fluid away from said casing.

16. A brake mechanism for a vehicle having in combination, a brake drum, two pairs of oppositely disposed shoes adapted to engage said drum to produce the braking effect, each of said shoes having a chamber therein, a pair of pintle members, two of said shoes being mounted upon each pintle for oscillating movement thereon, a casing at either side of said shoes, each of said casings having a supply and exhaust chamber therein, means for supplying cooling fluid to said supply chamber of each of said casings, means for conducting said fluid from said supply chambers through the chambers in each of said shoes and thence into said exhaust chambers of said casings respectively and means for exhausting said fluid from the exhaust chambers of said casings.

17. The structure set forth in claim 16, said pintles having passages therethrough connecting the supply and exhaust chambers in said casings respectively.

18. A brake mechanism for a vehicle having in combination, a plurality of brake drums, a plurality of brake shoes adapted to engage said brake drums to produce the braking effect, said brake shoes each having a circuitous passage therethrough, a plurality of concentrically formed conduits respectively communicating with said shoes and passages and circumferentially disposed in close proximity to said brake drums, means for circulating a cooling fluid through said conduits and passages and a thermostat for regulating said means controlled by the temperature of the circulated fluid whereby heat created by brake applications of said shoes and drums is absorbed by said fluid.

ROY C. HOYT.